(12) United States Patent
Hua et al.

(10) Patent No.: US 10,114,380 B2
(45) Date of Patent: Oct. 30, 2018

(54) SYSTEM, ESPECIALLY AN INSTALLATION, HAVING A VEHICLE WHICH IS MANEUVERABLE ON A FLOOR

(75) Inventors: Zhidong Hua, Karlsruhe (DE); Josef Schmidt, Graben-Neudorf (DE); Gunnar Meyrowitz, Oldenburg (DE); Andreas Wanjek, Waghauesel (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 1179 days.

(21) Appl. No.: 14/007,776

(22) PCT Filed: Mar. 29, 2012

(86) PCT No.: PCT/EP2012/001382
§ 371 (c)(1),
(2), (4) Date: Sep. 26, 2013

(87) PCT Pub. No.: WO2012/143085
PCT Pub. Date: Oct. 26, 2012

(65) Prior Publication Data
US 2014/0015339 A1 Jan. 16, 2014

(30) Foreign Application Priority Data
Apr. 21, 2011 (DE) .................. 10 2011 018 615

(51) Int. Cl.
*H01F 27/42* (2006.01)
*H01F 37/00* (2006.01)
(Continued)

(52) U.S. Cl.
CPC ........... *G05D 1/028* (2013.01); *G05D 1/0259* (2013.01); *G05D 1/0261* (2013.01)

(58) Field of Classification Search
CPC ..... G05D 1/0261; G05D 1/028; G01S 13/825
See application file for complete search history.

(56) References Cited

U.S. PATENT DOCUMENTS 5,267,173 A * 11/1993 Tanizawa ............. G05D 1/0261
104/88.03
6,493,614 B1 12/2002 Jung
(Continued)

FOREIGN PATENT DOCUMENTS

CN 101039729 A 9/2007
CN 101603830 A 12/2009
(Continued)

OTHER PUBLICATIONS

International Search Report, dated Jun. 18, 2012, issued in corresponding International Application No. PCT/EP2012/001382.

*Primary Examiner* — Rexford Barnie
*Assistant Examiner* — Rasem Mourad
(74) *Attorney, Agent, or Firm* — Hunton Andrews Kurth LLP

(57) ABSTRACT

A system, especially an installation, having a vehicle which is maneuverable on a floor is described. The vehicle has an RFID reading device which is connected to an antenna SL, and when the antenna SL enters the coupling region of a floor-installed antenna connected to a stationary RFID transponder, especially an RFID tag, then data stored in the transponder are able to be read out by the reading device. One or more permanent magnet(s) is/are situated on the floor, in particular fixedly joined in the floor, and the vehicle includes a sensor for detecting the direction of the magnetic field.

12 Claims, 5 Drawing Sheets

(51) Int. Cl.
   *H01F 38/00*   (2006.01)
   *G05D 1/02*   (2006.01)

(56) References Cited

U.S. PATENT DOCUMENTS

| | | | | |
|---|---|---|---|---|
| 2003/0191602 A1* | 10/2003 | Lee | ..................... | G05D 1/028 |
| | | | | 702/150 |
| 2005/0148281 A1 | 7/2005 | Sanchez-Castro et al. | | |
| 2007/0069021 A1* | 3/2007 | Elrod | .................... | G06K 17/00 |
| | | | | 235/451 |
| 2007/0255452 A1 | 11/2007 | Kwon et al. | | |
| 2009/0012667 A1* | 1/2009 | Matsumoto | .......... | G05D 1/0251 |
| | | | | 701/26 |
| 2009/0289113 A1* | 11/2009 | Vilnai | .................... | B67D 7/34 |
| | | | | 235/381 |
| 2010/0076599 A1 | 3/2010 | Jacobs et al. | | |
| 2010/0176922 A1* | 7/2010 | Schwab | ............ | G06K 7/10356 |
| | | | | 340/10.1 |
| 2010/0230501 A1* | 9/2010 | Fukushima | ...... | G06K 19/07749 |
| | | | | 235/492 |
| 2011/0254503 A1* | 10/2011 | Widmer | ............... | B60L 11/182 |
| | | | | 320/108 |

FOREIGN PATENT DOCUMENTS

| | | |
|---|---|---|
| DE | 10 2006 004 400 | 8/2007 |
| DE | 10 2006 024 948 | 12/2007 |
| DE | 10 2006 044 645 | 4/2008 |
| EP | 0 482 424 | 1/1996 |
| EP | 2 284 636 | 2/2011 |
| JP | 2008-288889 | 11/2008 |

\* cited by examiner

SYSTEM, ESPECIALLY AN INSTALLATION, HAVING A VEHICLE WHICH IS MANEUVERABLE ON A FLOOR

FIELD OF INVENTION

The present invention relates to a system, especially an installation, having a vehicle that is maneuverable on a floor.

BACKGROUND INFORMATION

The readout of data stored in a transponder with the aid of an RFID reading device is generally known.

SUMMARY

Therefore, the present invention is based on an objective of further refining a system, especially an installation, having a vehicle which is maneuverable on a floor, in which the navigation is able to be improved.

Important example features of the present invention in the system, especially the installation, which has a vehicle which is maneuverable on a floor, may be that the vehicle is equipped with an RFID reading device, which is connected to an antenna SL, and when antenna SL enters the coupling region of a floor-installed antenna, which is connected to a stationary RFID transponder, especially an RFID tag, then data stored in the transponder may be able to be read out by the reading device, and one or more permanent magnet(s) may be situated on the floor, in particular fixedly joined in the floor, and the vehicle may have a sensor for detecting the direction of the magnetic field.

This may have an advantage that the transponder may be used to determine a position, and the magnetic field may be used to determine the driving direction of the vehicle. It is therefore possible to determine the orientation of the vehicle and the position, i.e., the completely space-oriented positional information.

Since a simple and cost-effective permanent magnet can be used, the orientation of the vehicle, and thus the driving direction, may likewise be determined in an uncomplicated manner.

Multiple RFID transponders, especially RFID tags, with a stationary antenna connected in each case, may be installed, in particular in the floor, so that antenna SL, connected to the reading device, of the vehicle is able to be brought into the coupling region. This may have an advantage that the information about the position is transmittable by transponders and therefore detectable in a simple manner. In addition, further data may be transmitted to the vehicle in the transponder.

The permanent magnets may be situated so that the magnetic field generated by the permanent magnet(s) has the same direction in a plurality of coupling regions, the coupling regions being lined up next to each other, in particular. This may have an advantage that a single permanent magnet may be used for a plurality of coupling regions and a direction detection thus is able to be undertaken in a simple manner.

A further transponder may have an antenna S0, whose coupling region includes, or at least partially includes, the coupling regions of a plurality of transponders. This may have an advantage that large data quantities are storable, and the associated transponder is able to be used for multiple coupling regions. That is to say, the same data may be stored for the associated coupling regions.

Either all permanent magnets may be situated such that the magnetic field generated by the permanent magnets always has the same direction in the coupling regions, and/or not only information about the position but also information about the magnetic field orientation associated with the coupling region of the antenna of the transponder may be stored in the individual transponders, and may be read out by the reading device. This may have an advantage that additional information can be read out. This information, for example, may be driving instructions or orders for the vehicle. In addition, it is possible to store information for a subsequent vehicle in the transponder, provided the reading device is also operable as writing device.

Information that does not relate to the position of the transponder may be stored, able to be stored and able to be read out in the further transponder, the information including instructions for following vehicles, in particular. This may have an advantage that a vehicle driving ahead is able to store instructions for a following vehicle.

The sensor may include a Hall-effect sensor and/or a Wiegand sensor, especially such that the direction of the magnetic field crossing the sensitive area of the sensor is detectable. This may have an advantage that the driving direction, i.e., the orientation of the vehicle, is able to be detected.

Antenna SL may be implemented as planar winding, the plane being aligned in parallel with and/or being situated at a distance from a plane that encompasses the antennas of the floor-installed transponders. This may have an advantage that the vehicle is able to drive across the floor-installed components and the sensor may be provided at an elevation above the floor.

The RFID reading device may be an RFID write/read device, i.e., developed for the transmission and, optionally, for the receiving of data. This may have an advantage that data are not only able to be read out from a transponder, but also transmittable and thus storable in a memory of the transponder, especially in the memory of the particular transponder whose coupling region assigned to its antenna S0 encompasses, or at least partially encompasses, multiple coupling regions.

The coupling regions may be regions featuring inductive coupling, in particular since antenna SL is able to be inductively coupled to the antennas of the transponders by the vehicle reaching a suitable position. This may have an advantage that no far-field transmission takes place, but the positional information of the transponder, inductive coupling is achievable only in the narrow space region around the antenna of the transponder, i.e., in its coupling region, and the positional information is therefore transmittable only in this particular space region. Errors in the position determination are therefore preventable.

The magnetic field generated by the permanent magnets in the coupling regions may be at least ten times, especially at least one hundred times, stronger than the remaining background field, especially the earth's magnetic field. This may have an advantage that the background field is suppressible by means of the permanent magnets and a high signal-to-noise ratio is achievable.

A primary conductor may be installed in the floor, to which a secondary winding of the vehicle is inductively coupled for the inductive supply of the vehicle, the antennas of the transponders each having a first and an additional partial winding, which have a wound area, a winding direction, and a winding number such that the voltages induced in the partial windings by the primary conductor are of equal amount and cancel each other out, the primary conductor in particular being set apart from the coupling regions of the floor-installed antennas such that the magnetic field generated by the primary conductor is essentially homogeneous. This may have an advantage that an inductive power supply may be used for the vehicle, despite the occurrence of the magnetic fields caused by the high-voltage current of the primary current. However, since the antennas of the transponders and the reading device are made up of partial windings into which voltages are induced that are equal in terms of amounts but in opposition, a suppression of the effect of the primary conductor current is achievable and the data transmission may be carried out without interference. To do so, however, the antenna of the reading device should the positioned in the coupling region of the antenna of the particular transponder such that the first partial winding of the antenna of the transponder and the first partial winding of the antenna of the reading device are coupled. In addition, the further antennas of the transponder and the reading device should likewise be coupled to each other.

The present invention is not limited to the feature combinations described herein. Those skilled in the art will recognize additional meaningful combination possibilities of features of the specification and/or the figures, arising in particular from the stated objectives and/or the objectives resulting from a comparison with the related art.

Exemplary embodiments of the present invention will now be explained in greater detail with reference to the accompanying Figures.

DETAILED DESCRIPTION

Figure 1:
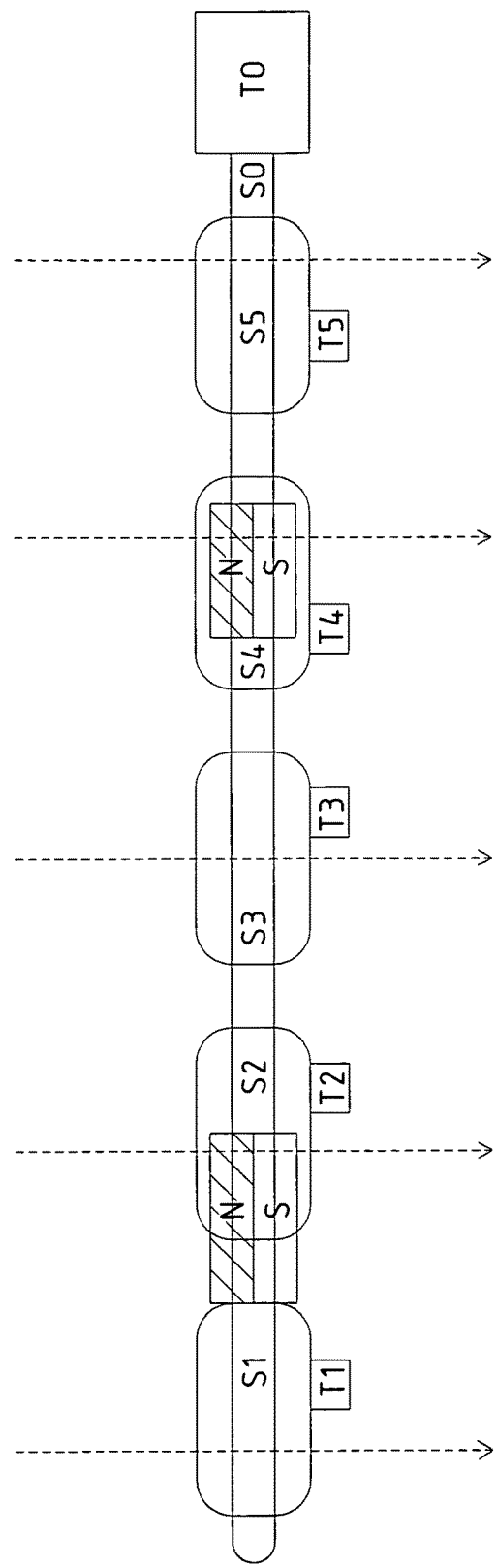
FIG. 1 shows a first exemplary embodiment according to the present invention, in which permanent magnets are situated in stationary manner in the region of RFID transponders on a surface across which a vehicle is able to drive.

As shown in FIG. 1, permanent magnets are situated on the floor of an installation and are aligned parallel to each other.

In addition, an RFID transponder T0 having an antenna S0 installed in elongated fashion is provided, in whose region additional RFID transponders T1, T2, T3, T4, T5 with their individual antennas S1, S2, S3, S4, S5 are situated.

The permanent magnets aligned parallel to each other generate an essentially unidirected magnetic field in a plane situated above the floor, so that a sketched direction of the magnetic field in the plane in the region of antennas S1, S2, S3, S4, S5 of the transponders is produced. The plane preferably is provided at a slight distance from the floor and parallel to the floor.

Vehicle M maneuverable on the floor includes an RFID reading device provided with an antenna SL, in whose region, especially in its wound surface, a magnetic sensor H is situated, especially a Hall-effect sensor or GMR sensor.

Once antenna SL of the vehicle arrives in a space region in which a data transmission by the reading device is possible between floor-installed transponders T1, T2, T3, T4 or T5, it is therefore possible not only to determine a position by reading out these transponders, but also to determine the orientation of vehicle M by detecting the magnetic field, in particular determining the direction of the magnetic field generated by the permanent magnets.

In addition, the reading device can also read out a larger data quantity from transponder T0, which is provided for storing large quantities of data.

As a result, it is thereby possible to read out the information about the reached position from the transponder data when antenna SL arrives in the coupling region to antenna S3 of transponder T3, to determine the orientation of the vehicle with the aid of sensor H, and to read out further data of transponder T0 by means of a data transmission. These additional data may also be read out when antenna SL of the vehicle reaches the positions of the other transponders T1, T2, T4 or T5.

The vehicle has a steering system, so that a change in direction is actuable as a function of the determined driving direction and the newly determined destination position.

When arriving at another region according to FIG. 1, which is situated on the floor, shifted in parallel, it is once more possible to determine the new position via the local transponder (T1, T2, T3, T4 or T5) and to read out data from the local new transponder T0. In addition, the driving direction is able to be determined and a new driving direction may be actuated as a function thereof. This therefore enables a navigation on the floor surface without the vehicle having to be equipped with a navigation system or a similar device.

Figure 2:
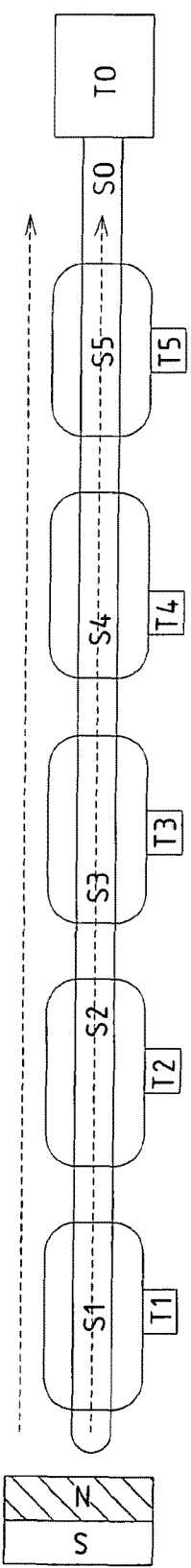
FIG. 2 shows a second exemplary embodiment according to the present invention, in which the permanent magnets are rotated at 90° in comparison with FIG. 1.
Figure 3:
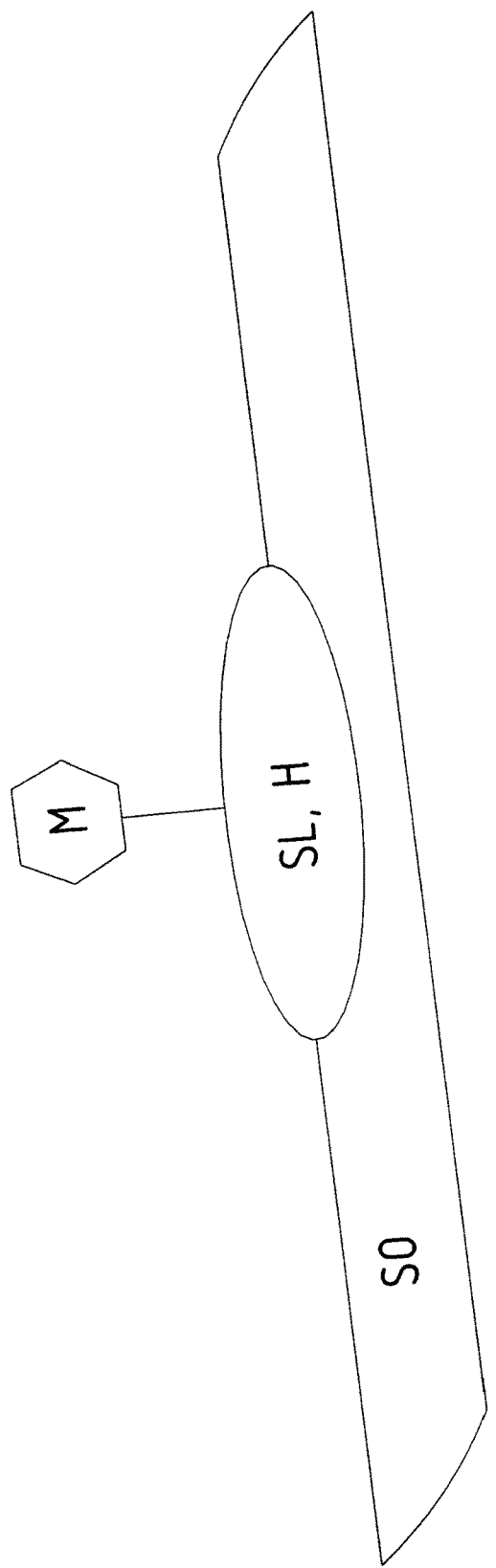
FIG. 3 shows the position of the vehicle upon reaching antenna S0 of the transponder.
Figure 4:
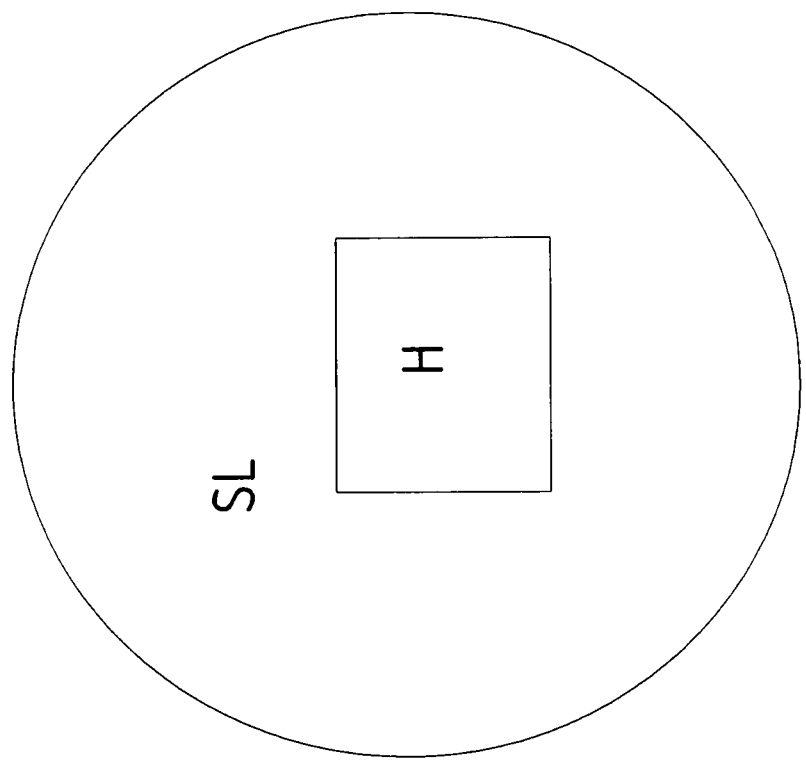
FIG. 4 shows a sensor H of vehicle M in the region of antenna SL of vehicle M.
Figure 5:
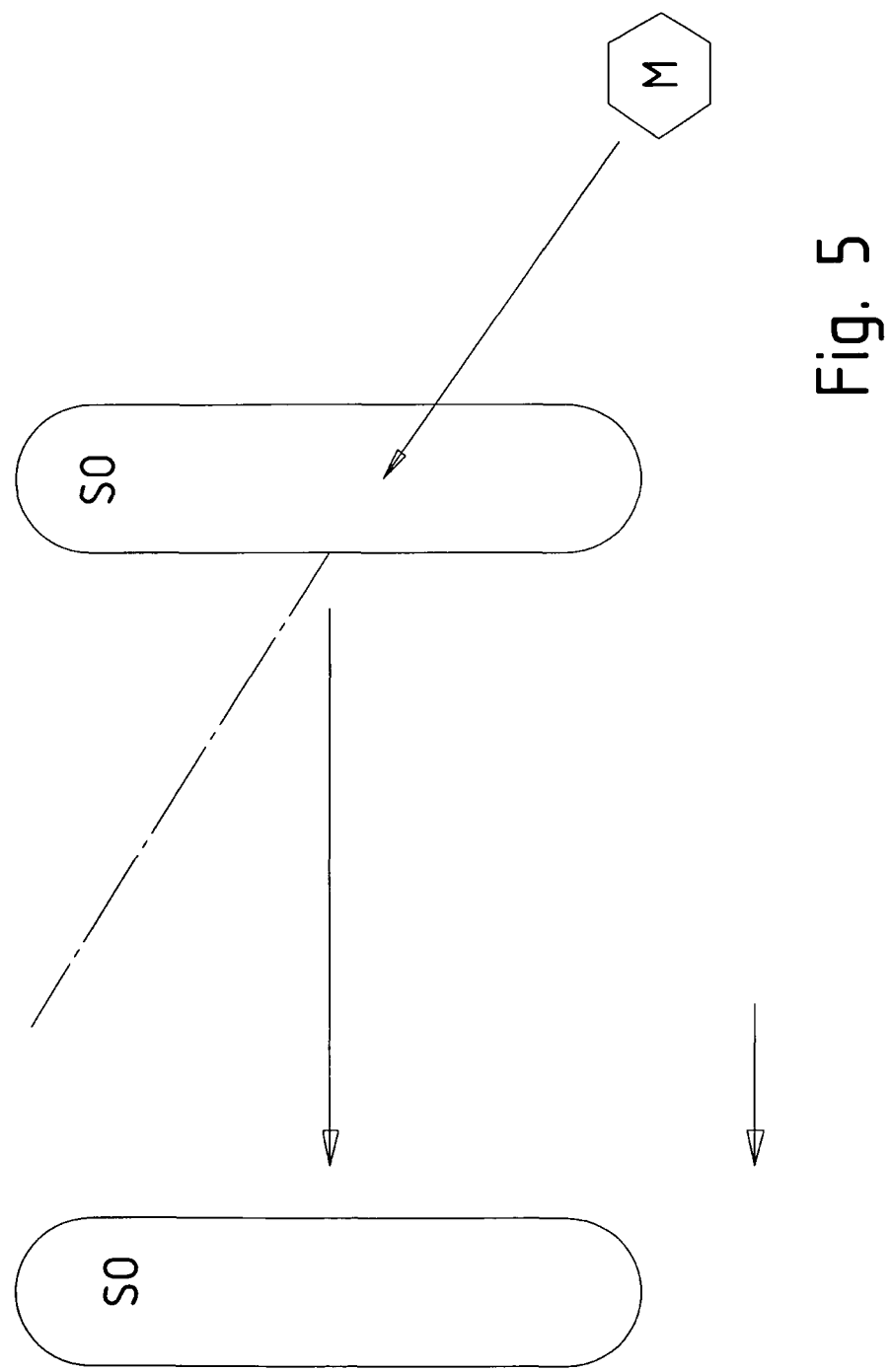
FIG. 5 shows the driving direction of the vehicle, which encounters a first and then later, another antenna S0, shifted in parallel, of a transponder T0, the position and direction of the vehicle being determined when vehicle M arrives in the region of first antenna S0, and a change in direction takes place as a function thereof, so that the vehicle reaches the region of the additional antenna and there, a desired position in the region of a further transponder.

In contrast to FIG. 1, the magnetic field direction in the region of antenna S0 is rotated at 90° in FIG. 2.

A coupling region describes the space region in the range of the individual transmission means in which a data transmission between antenna S0 of the reading device and an antenna (S1, S2, S3, S4, S5) of one of the transponders is able to be carried out. This space region thus is dependent upon the sensitivity of the receiver and the transmission power. Preferably, the coupling region is the region of the inductive coupling, so that the data transmission takes place via the inductive coupling of the antennas, but not via a far-field transmission. The range therefore is only negligibly larger than the antenna of the transmitter. As a result, a precise position determination is possible, in which the precision corresponds to a resolution on the order of magnitude of the space region.

Additional exemplary embodiments according to the present invention use a write-read device instead of the read device, so that data are also transmittable from the vehicle to a transponder, e.g., T0, and storable there. Thus, data, e.g., driving orders for a following vehicle as well, can be stored in transponder T0 and forwarded to a following vehicle.

LIST OF REFERENCE NUMERALS

T0 transponder for data storage
T1, T1, T2, T3, T4, T5 transponders for position marking
S0 antenna of transponder T0
S1, S2, S3, S4, S5 antenna of the individual transponder T1, T1, T2, T3, T4, T5
N north pole of the permanent magnet
S south pole of the permanent magnet
M mobile unit, i.e., vehicle
SL antenna of the RFID reading device of vehicle M
H magnetic sensor, especially Hall-effect sensor or GMR sensor
---> magnetic field lines
→driving direction

What is claimed is:

1. A system, comprising:
   a vehicle which is maneuverable on a floor, the vehicle including an RFID reading device, which is connected to an antenna SL, the antenna SL adapted to enter a coupling region of a floor-installed antenna, which is connected to a stationary RFID transponder, and data stored in the transponder being readable by the reading device;
   wherein the data stored in the transponder includes information transmitted from at least one of the vehicle and another vehicle,
   wherein at least one permanent magnet is situated on the floor or fixedly joined in the floor,
   wherein the vehicle includes a sensor for detecting a direction of a magnetic field of the at least one permanent magnet.

2. The system according to claim 1, wherein a plurality of RFID transponders, with a connected antenna in each case, are situated in stationary manner at the floor or installed in the floor, so that the antenna SL, connected to the reading device, of the vehicle inductively couples to the plurality of transponders at a plurality of coupling regions of the respective plurality of transponders.

3. The system according to claim 2, wherein a plurality of permanent magnets is situated so that the magnetic field generated by the plurality of permanent magnet has a same direction in the plurality of coupling regions, the coupling regions being lined up next to each other.

4. The system according to claim 2, further comprising:
   a further transponder including an antenna S0, whose coupling region includes, or at least partially includes, the plurality of coupling regions of the plurality of transponders.

5. The system according to claim 3, wherein at least one of (i) the plurality of permanent magnets are situated such that the magnetic field generated by the plurality of permanent magnets always has the same direction in the plurality of coupling regions and (ii) information about a position and a magnetic field orientation associated with the coupling region of the antenna of each of the plurality of transponders is stored in each of the plurality of transponders and is readable by the reading device.

6. The system according to claim 4, wherein information that does not relate to a position of the plurality of transponders is stored, able to be stored and read out in the further transponder, the information including instructions for following vehicles.

7. The system according to claim 1, wherein the sensor includes at least one of a Hall-effect sensor and a Wiegand sensor, such that the direction of the magnetic field crossing a sensitive region of the sensor is detectable.

8. The system according to claim 1, wherein the antenna SL is implemented as planar winding in a plane aligned at least one of in parallel with and at a distance from a plane that encompasses the antenna of the floor-installed transponder.

9. The system according to claim 1, wherein the RFID reading device is an RFID write/read device adapted for at least one of transmitting and receiving data.

10. The system according to claim 1, wherein the coupling region is a region of inductive coupling, in which the antenna SL inductively couples to the antenna of the transponder when the vehicle enters the coupling region.

11. The system according to claim 1, wherein the magnetic field generated by the at least one permanent magnet in the coupling region is at least ten times or at least one hundred times stronger than a remaining background field or earth's magnetic field.

12. The system according to claim 1, further comprising:
   a primary conductor installed in the floor, to which a secondary winding of the vehicle is inductively coupled for inductive supply of the vehicle,
   wherein the antenna of the transponder includes a first and an additional partial winding, the first and additional partial windings having a wound surface, a winding direction, and a winding number such that voltages in the first and additional partial windings induced by the primary conductor are of equal amount and cancel each other out,
   wherein the primary conductor is set apart from the coupling region of the floor-installed antenna such that a magnetic field generated by the primary conductor is essentially homogeneous.

* * * * *